US007463605B2

(12) United States Patent
Choyi et al.

(10) Patent No.: US 7,463,605 B2
(45) Date of Patent: Dec. 9, 2008

(54) APPARATUS, AND ASSOCIATED METHOD, FOR FACILITATING LOCAL MOBILITY MANAGEMENT IN A HETEROGENEOUS RADIO COMMUNICATION NETWORK

(75) Inventors: Vinod Kumar Choyi, Plano, TX (US); Behcet Sarikaya, Plano, TX (US)

(73) Assignee: Alcatel Lucent, Paris (FR)

( * ) Notice: Subject to any disclaimer, the term of this patent is extended or adjusted under 35 U.S.C. 154(b) by 1026 days.

(21) Appl. No.: 10/313,670

(22) Filed: Dec. 6, 2002

(65) Prior Publication Data

US 2004/0109472 A1 Jun. 10, 2004

(51) Int. Cl.
*H04J 3/16* (2006.01)
(52) U.S. Cl. .................... 370/331; 370/401; 370/338; 370/466
(58) Field of Classification Search ............... 370/395.5, 370/395.54
See application file for complete search history.

(56) References Cited

U.S. PATENT DOCUMENTS

2002/0136226 A1* 9/2002 Christoffel et al. .......... 370/401
2002/0194385 A1* 12/2002 Linder et al. ................ 709/250

FOREIGN PATENT DOCUMENTS

WO 00/48363 A1 8/2000
WO 02/15598 A1 2/2002

OTHER PUBLICATIONS

Perkins, IP Mobility Support for IPv4; IEEE Network Working Group, RFC 3220; Jan. 2002; pp. 1-85.

Plummer, An Ethernet Address Resolution Protocol or Converting Network Protocol Addresses to 48.bit Ethernet Address for Transmission on Ethernet Hardware; IEEE Networking Working Group, RFC 826; Nov. 1982; pp. 1-8.
Salkintzis, et al.; Wlan-Gprs integration for next-generation mobile data networks; Wireless Communications, IEEE [see also IEEE Personal Communications]; Oct. 2002; pp. 112-124; vol. 9, Issue 5 Digital Object Identifier 10.1109/MWC.2002.1043861.
Pahlavan, et al; Handoff in hybrid mobile data networks; Personal Communications, IEEE [see also IEEE Wireless Communications]; Apr. 2000: pp. 34-47; vol. 7, Issue 2 Digital Object Identifier 10.1109/98.839330.
Sanmateu, et al.; Seamless mobility across IP networks using Mobile IP; Computer Networks: The International Journal of Computer and Telecommunications Networking; Sep. 2002; pp. 181-190; vol. 40, Issue 1; ISSN:1389-1286.

* cited by examiner

*Primary Examiner*—Chau Nguyen
*Assistant Examiner*—Suk Jin Kang

(57) ABSTRACT

Apparatus, and an associated method for facilitating routing of a datagram sourced at a content source to a mobile node. The mobile node is selectably operable in a heterogeneous network having two or more network parts operable pursuant to different operating protocols. An ARP broadcast is generated either gratuitously or by proxy mechanism on behalf of the mobile by the GGSN, Access Router or by the Home Agent indicating the network element that is responsible for forwarding of datagrams to the mobile and thereby implying the network part with which the mobile node is resident. And, the datagram is forwarded from the gateway network to the network element that is responsible for forwarding of datagrams to the mobile node. The datagrams are then routed through the network part identified by the broadcast to be the network part with which the mobile node is resident.

23 Claims, 2 Drawing Sheets

APPARATUS, AND ASSOCIATED METHOD, FOR FACILITATING LOCAL MOBILITY MANAGEMENT IN A HETEROGENEOUS RADIO COMMUNICATION NETWORK

The present invention relates generally to communications with a mobile node operable in a heterogeneous home operator network (HON). The home operator network has separate network parts, operable pursuant to separate operational protocols, such as separate network parts forming a WLAN (Wireless Local Area Network) and a cellular communication network. More particularly, the present invention relates to apparatus, and an associated method, by which to facilitate routing of a datagram that is to be delivered to a mobile node to an appropriate one of the separate network parts, depending upon with which of the separate parts that the mobile node is resident.

ARP (Address Resolution Protocol) broadcasts are generated at the network part with which the mobile node is resident. The broadcasts identify the network part with which the mobile node is resident as the network through which the datagrams are to be routed. Timely delivery of the datagrams to the mobile node is thereby better assured.

BACKGROUND OF THE INVENTION

The use of communication systems through which to communicate data is an endemic part of modern society. A communication system is formed, at a minimum, of a set of communication stations interconnected by way of a communication channel. Data originated, or otherwise sourced at, a first of the communication stations, referred to as a sending station, is communicated upon the communication channel to be delivered to a second of the communication stations, referred to as a receiving station.

A wide variety of different types of communication systems have been developed, and implemented, as a result of advancement in communication technologies. And, such advancements have also permitted existing communication systems to be improved. For instance, such advancements in communication technologies have permitted the introduction of new types of radio communication systems as well as improvements to existing radio communication systems.

In a radio communication system, the communication channels interconnecting sending and receiving stations are defined, at least in part, upon a radio link defined between the sending and receiving stations. The radio links are formed of portions of the electromagnetic spectrum. Infrastructure costs associated with installation of the network parts of a radio communication system are generally less than corresponding costs associated with installation of a conventional, wireline network. And, a radio communication system can be implemented as a mobile communication system, providing communication mobility.

A cellular communication system is an exemplary type of radio communication system. The network infrastructures of cellular communication systems have been installed throughout large geographical areas of the world, and the usage, i.e., penetration, levels of cellular communication systems is significant.

Historically, cellular communication systems have been used primarily to effectuate conventional, circuit-switched communication services. Such conventional usages of cellular communication systems, include, for instance, circuit-switched voice communications as well as low band width data communication services.

The advancements in communication technologies include, in significant part, advancements in digital processing and communication techniques, resulting in a migration of cellular, and other radio, communication systems to digital cellular, and other radio, communication systems. Second-generation (2G), and subsequent-generation cellular communication systems, are digital communication systems, predicated upon digital communication techniques. So-called 2.5 G communication systems, third-generation (3G), and post-third generation communication systems, e.g., 4G (fourth generation) systems all utilize digital communication techniques. A UMTS/GPRS Universal Mobil Telephone Service/General Packet Radio Service) System, e.g., utilizes digital communication techniques.

Other types of radio communication systems also have benefited from, or have been made possible, as a result of advancements in communication technologies and digital communication techniques. For instance, WLANs (wireless local area networks) have been developed and implemented. WLANs traditionally have, generally, been implemented in the form of private systems. However, increasingly, public wireless communications are extending into WLAN environments. WLANs are advantageously utilized for the reason that high data rate communication services are effectuable therethrough. And, such services are generally effectuable at costs that are relatively less than the corresponding costs of effectuation of such services by way of a cellular communication system.

An IEEE 802.11 operating specification or a variant thereof, sets forth the operating protocols of a communication scheme pursuant to which some WLANs are constructed to be operable.

The bandwidth offered by WLAN is much higher, around 11-54 Mb/s, with much smaller coverage areas around 60 meters within indoors when compared to their 3G counterparts. The WLANs can therefore be thought of as complementary technology to 3G. WLANs are now deployed in hot-spots like airports, hotels, conference halls etc. A 3G mobile user can take advantage of the high bandwidth of WLANs within the hot-spots. The challenge is, how the transition from 3G to WLAN can take place so that the on-going sessions can be maintained without having to re-start the existing sessions that I started by the mobile when it was in the 3G network. That is to say, mobile nodes are sometimes constructed to be operable to permit their operation to communicate by way of a cellular communication system or a WLAN. The separate systems are, however, operable pursuant to separate technologies. And, due to the mobile nature of a mobile node, the mobile node is positionable to communicate, initially, with one of the networks, thereafter to be positionable to communicate with another of the networks.

Data that is to be delivered to the mobile node must be routed to the appropriate one of the network parts. That is, the data must be routed through an appropriate one of the WLAN or the network of the cellular communication system, e.g., the UMTS/GPRS network, to deliver the data to the mobile node in a manner as timely as possible. Having a heterogeneous radio connection allows the data to be delivered to the mobile using either the WLAN or the UMTS/GPRS network so that the mobile could be afforded higher bandwidth and lower delay. Any manner by which better to alert with which of the network parts that the mobile node is resident would facilitate timely delivery of data to the mobile node.

It is in light of this background information related to communications in a heterogeneous communication system that the significant improvements of the present invention have evolved.

SUMMARY OF THE INVENTION

The present invention, accordingly, advantageously provides apparatus, and an associated method, for facilitating communications with a mobile node operable in a heterogeneous mobile operator network. The focus here is from an Operator network and that the mobile node has subscription to and also known as the Heterogeneous Mobile Home Operator Network (HMHO).

Through operation of an embodiment of the present invention, a manner is provided by which to facilitate routing of a datagram to a mobile node. The heterogeneous home operator network has separate network parts, operable pursuant to separate operational protocols, such as separate network parts forming a WLAN (wireless local area network) and a cellular communication network, such as a cellular communication network that provides for GPRS (General Packet Radio Service). The network part with which the mobile node is resident is identified, and the datagram is routed through the identified network part, better to ensure, thereby, that the datagram is timely delivered to the mobile node.

ARP (Address Resolution Protocol) broadcasts are generated at the network part with which the mobile node is resident. Proxy ARP and Gratuitous ARP are variants of the Address Resolution Protocol wherein the host that sends the ARP broadcasts are doing it on behalf of some other host. This type of broadcast is done so that the host that sends the Proxy ARP is able to receive datagrams intended for another host by using its Layer 2 address as the destination. This is in contrast to a regular ARP broadcast, wherein the host that sends the ARP broadcast is requesting the delivery of only those datagrams that belong to the host.

The broadcasts identify the network element that is responsible for routing in the network part with which the mobile node resides. Thereby, through such identification, the datagram is routed through the identified network part. Timely delivery of the datagram to the mobile node is thereby better assured.

In one aspect of the present invention, apparatus is provided for an access point, or other network part, of a WLAN. A detector is positioned to detect when a mobile node is resident with the WLAN. The detector detects, for instance, registration of the mobile node when the mobile node initially registers to become resident with the WLAN. And, detection is also made, for instance, subsequent to the initial registration to confirm continued presence of the mobile node with the WLAN. The registration message, as well as other messages used to detect the residency of the mobile node at the WLAN, is generated, for instance, pursuant to the operating protocols set forth in an appropriate IEEE 802.11 operating specification. The message identifies, such as by the Layer 2-MAC address, and the IP address by which the mobile node is identified, the identity of the mobile node. Such an indication is contained in the messages detected by the detector.

In another aspect of the present invention, further apparatus is provided for the access point, or other network part, of the WLAN. An identity broadcaster operates to broadcast a broadcast message, in a manner analogous to broadcast of a Gratuitous ARP or Proxy ARP to alert recipients of the broadcast to the residency of the mobile node with the WLAN and also the network element that is responsible for routing of datagrams to the mobile node.

In one aspect of the present invention, apparatus is provided for an access router, or other network part, of a WLAN. A detector is positioned to detect when a mobile node is resident with the WLAN. The detector detects, for instance, registration of the mobile node when the mobile node initially registers to become resident with the WLAN. And, detection is also made, for instance, subsequent to the initial registration to confirm continued presence of the mobile node with the WLAN. The registration message, as well as other messages used to detect the residency of the mobile node at the WLAN, is generated, for instance, pursuant to the operating protocols set forth in an appropriate IEEE 802.11 operating specification. The message identifies, such as by the Layer 2-MAC address, and the IP address by which the mobile node is identified, the identity of the mobile node. Such an indication is contained in the messages detected by the detector.

In another aspect of the present invention, further apparatus is provided for the access router, or other network part, of the WLAN. An identity broadcaster operates to broadcast a broadcast message, in a manner analogous to broadcast of a Gratuitous ARP or Proxy ARP to alert recipients of the broadcast to the residency of the mobile node with the WLAN and also the network element that is responsible for routing of datagrams to the mobile node.

In another aspect of the present invention, a listing is maintained at the network of the location of the mobile node, as indicated by a prior-transmitted broadcast. By maintaining such a listing, the most-recently identified residency of the mobile node is maintained thereat. And, subsequent routing of a datagram through the appropriate network part is further facilitated.

In another aspect of the present invention, apparatus is provided for a GGSN (Gateway GPRS Service Node), or other network part, of a cellular communication system, such as a cellular communication system operable to provide GPRS (General Packet Radio Service). A detector is positioned to detect when a mobile node is resident with the cellular communication network. The residency of the mobile node with the cellular communication network is detected, for instance, by detection of registration messages sent by the mobile node when the mobile node enters an area encompassed by the network. Residence of the mobile node with the cellular communication network is also detected, for instance, responsive to generation by the mobile node of location update messages.

In another aspect of the present invention, an identification broadcaster is located at the cellular communication network. The identification broadcast operates responsive to detections made by the detector to broadcast the residence of the mobile node with the cellular communication network. The broadcast is, for instance, analogous to an ARP (Address Resolution Protocol) broadcast that broadcasts the location of the node to be resident with, or otherwise associated with, the cellular communication network. The broadcasts are made, for instance, by proxy means or gratuitously. A listing can also be utilized to store previously-broadcasted messages, thereafter to be later-accessible to identify the most-recently indicated residency of the mobile node and the element responsible for routing of the datagrams to the mobile node.

In one implementation, a manner is provided for a home operator network (HMON) formed of a WLAN and a UMTS/GPRS network by which to facilitate appropriate routing of a datagram to a mobile node. Routing of the datagram through an appropriate one of the parts of the home operator network better assures timely delivery of the datagram to the mobile node. The mobile node sends indications, such as registration messages or location updates, to identify with which of the network parts of the home operator network that the mobile node is to be, or is, resident. Once the residency of the mobile node is detected at one of the network parts of the HMON, a GARP (Gratuitous Address Resolution Protocol) broadcaster generates a GARP-like broadcast or a Proxy ARP (Proxy Address Resolution Protocol) broadcaster generates a Proxy-ARP-like broadcast to broadcast the residency of the mobile node with that network part of the home operator network. By generating the broadcast of the location of the mobile node with a particular part of the home operator network, datagrams, sourced by a content source, are routed to the appropriate network element responsible for forwarding of datagrams within one of the network parts. Improved timeliness of delivery of the datagram to the mobile node is thereby facilitated.

In these and other aspects, therefore, apparatus, and an associated method, is provided for a radio communication system that has a network including a first part and a second part. The first part is operable pursuant to a first operating protocol. And, the second part is operable pursuant to a second operating protocol. The radio communication system has a mobile node selectably operable pursuant to each of the first and second operating protocols. The mobile node is positionable to be resident with either of the first part and the second part. Routing of a datagram to an appropriate one of the first part and the second part is facilitated. A network-based identification broadcaster is at least coupled to receive presence indications representative of residence of the mobile node with either of the first part and the second part of the network.

The network-based identification broadcaster broadcasts a message identifying the mobile node and the residence thereof with either of the first part and the second part of the network.

One or more elements within the Gateway network are able to receive, process and update the entries when ARP, GARP and the Proxy ARP broadcasts sent by the network elements that are responsible for forwarding of datagrams within their respective parts of the HMON.

A more complete description of the present invention and the scope thereof can be obtained from the accompanying drawings that are briefly summarized below, the following detailed description of the presently-preferred embodiments of the invention, and the appended claims.

DETAILED DESCRIPTION

Figure 1:
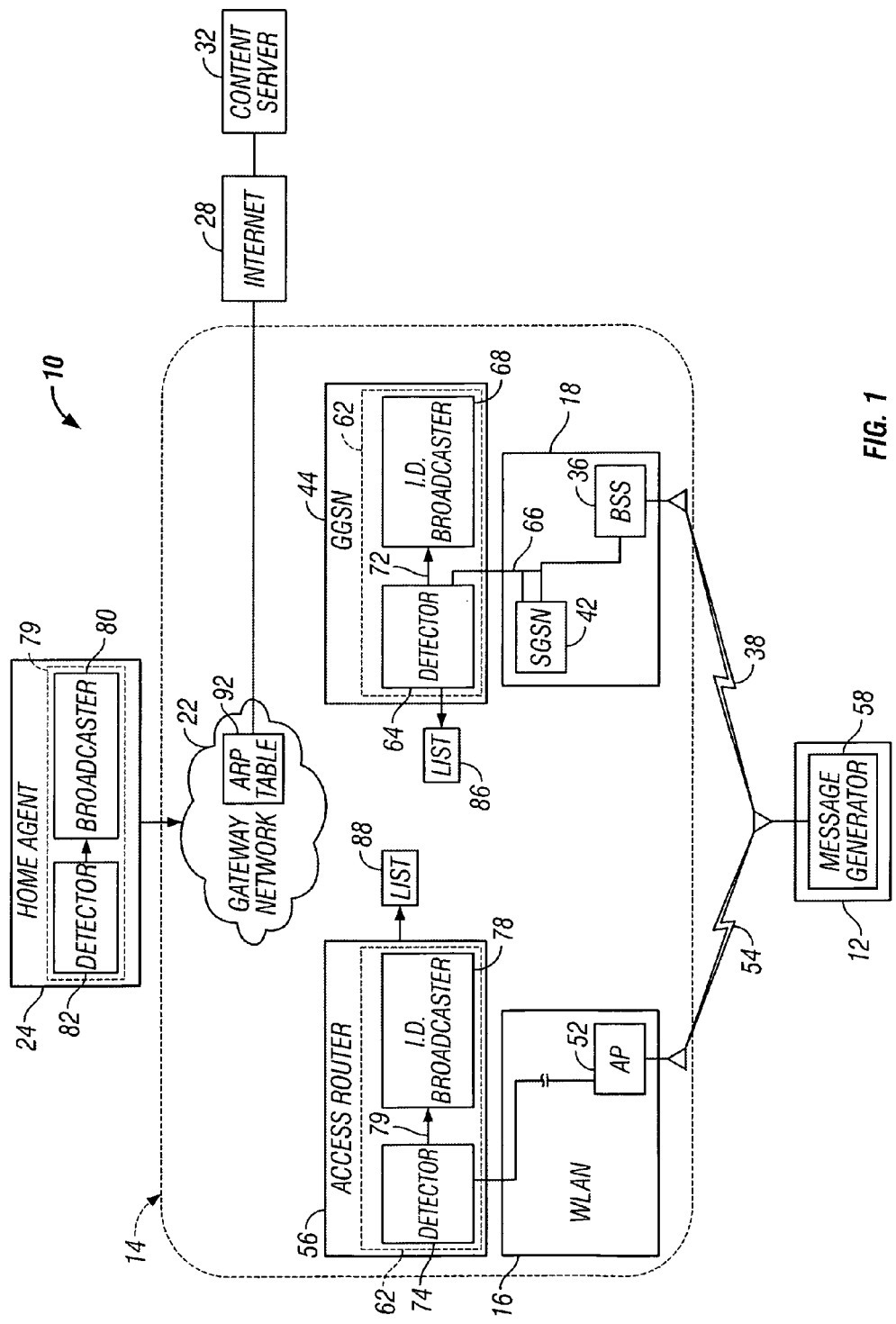
FIG. 1 illustrates a functional block diagram of a radio communication system that includes an embodiment of the present invention as a portion thereof.

Referring first to FIG. 1, a radio communication system, shown generally at 10, provides for radio communications with mobile nodes, of which the mobile node 12 is representative. The mobile node forms a multi-mode device, capable of operation pursuant to a first operating protocol and also pursuant to a second operating protocol. Here, the first operating protocol is formed of the operating protocol of a UMTS (Universal Mobile Telephone Service) system, here a GPRS (General Packet Radio Service) system, or variant thereof. And, the second operating protocol here is formed of the operating protocol of a WLAN operable pursuant to an IEEE 802.11 standard, or a variant thereof such as HiperLAN. And, correspondingly, here, the multi-mode device is capable of operation, selectably pursuant to the operating protocol of the UMTS and also pursuant to the operating protocol of the WLAN.

The radio communication system defines a home mobile operator network (HMON) 14, here formed of a WLAN network part 16, and a GPRS network part 18. And, the home operator network also defines a gateway network part 22. A home agent (HA) 24 is associated with the home operator network.

The home operator network 14 shown in the figure is exemplary. A home operator network, formed of other types of network parts, including additional network parts, can alternately be shown. While the following description shall describe exemplary operation of an embodiment of the present invention with respect to its implementation in the exemplary home operator network shown in the figure, the teachings of the present invention can analogously be applied to home operator networks formed of such other configurations.

The gateway network 22 of the home operator network is coupled to a packet data network, here the internet, 28. The gateway network consists of one or more Home Agents 24 along with other routers and also the network element responsible for forwarding of datagrams within the GPRS network, namely the GGSN 44. The gateway network also consists of the network element, the access router 56 that is responsible for forwarding of datagrams within the WLAN. The gateway network may also have any number of GGSNs that are responsible for forwarding of datagrams within other UMTS/GPRS network. The gateway network may also contain any number of other access routers that are responsible for forwarding of datagrams within their respective WLANs. Other networks, and devices, are also coupled to the internet, in conventional manner. Here, a content server 32, forming a content source at which data, available for communication by way of the communication system, is sourced. Data sourced at the content server includes, for instance, multi-media data that is communicated to effectuate a multicast and broadcast service. The content server, more generally, is representative of a source of any data, herein referred to as a datagram, which is capable of communication during operation of an embodiment of the present invention.

Here, the GPRS network part 18 is shown to include a base station system 36 that includes a base transceiver station. The base transceiver station operates to transceiver radio signals with the mobile node 12. The radio signals communicated between the base transceiver station of the base system and the mobile node are communicated upon radio channels defined upon a radio link 38 extending therebetween. And, the radio signals are formatted, and otherwise formed and sent, according to the operating protocols of the UMTS/GPRS system set forth in the operating specification thereof.

The GPRS network is further shown to include an SGSN (serving GPRS service node) 42. And, the GPRS network also includes a GGSN (Gateway GPRS Service Node) 44. When the mobile node is resident with the GPRS network to be operable to communicate therewith, data sourced at the content server 32 is routable to the mobile node upon a packet-switched communication path formed through the internet 28, the gateway network 22, and the GPRS network 18, as well as also, upon the radio link 38 extending to the mobile node.

The WLAN comprises a WLAN fabric having an access point (AP) 52. The access point forms a radio transceiver capable of transceiving radio signals with the mobile node 12. The radio signals transceived between the access point 52 and the mobile node 12 are communicated upon radio channels defined upon the radio link 54 formed to extend between the access point and the mobile node. The radio signals are formatted, and otherwise formed and communicated, according to the protocols set forth in the operating specification of the IEEE 802.11 standard pursuant to which the WLAN is operable. The WLAN is further shown to include an access router 56 forming a gateway between the WLAN part and the gateway network.

The mobile node is moveable, to be positionable to be within the coverage area encompassed by the WLAN or in an area encompassed by the GPRS network. The coverage areas might, of course, partially, or wholly, overlap such that the mobile node selectably communicates with a selected one of the network parts. The mobile node includes a message generator 58 that operates to generate messages for communication to the infrastructure of the home operator network. The messages formed by the message generator are formatted, selectably, according to the operating protocol of the GPRS network and according to the operating protocol of the WLAN. That is to say, the message generator generates messages formatted pursuant to the operating protocol of the GPRS network when the mobile node is to be, or is, operable with the GPRS network, viz., is resident with the GPRS network, messages generated by the message generator are formatted pursuant to the GPRS operating specification. Registration messages and location update messages are exemplary of the messages generated by the message generator. And, analogously, when the mobile node is, or is to be, resident with the WLAN, messages generated by the message generator are formatted pursuant to the IEEE 802.11 operating protocol. The base transceiver station of the GPRS network and the access point of the WLAN part detect the messages generated by the message generator of the mobile node, as appropriate.

The GGSN 44 of the GPRS network part of the home operator network includes apparatus 62 of an embodiment of the present invention. The apparatus includes a detector 64 that operates to detect delivery to the GPRS network of the messages generated by the message generator indicating residency of the mobile node with the GPRS network part. The detector is coupled to receive indications, here upon the line 66, of detection by the base transceiver station of the BSS of delivery thereat of the messages generated by the message generator of the mobile node. The apparatus further includes an identification broadcaster 68, that is selectably operable upon detection of the detector of the delivery to the GPRS network part of the messages generated by the message generator indicative of residency of the mobile node with the GPRS network and also indicating the network element, here being the GGSN 44 to which the datagrams have to be routed to when the gateway network receives datagrams intended for a mobile node connected to the GPRS network. Indications of the detection are here represented to be provided to the ID broadcaster by way of the line 72. The identification broadcaster operates to broadcast Gratuitous ARP (Address Resolution Protocol) or a Proxy ARP message to broadcast the residency of the mobile node with the UMTS/GPRS network and also indicating the network element, here being the GGSN 44 that is responsible for forwarding of datagram to the mobile node within the GPRS network. Thereby, other devices in the Gateway network such as the Home Agent, the Gateway to the HMON, other GGSNs, access routers and other routers within the Gateway network 22 are alerted to the residency of the mobile node with the GPRS network.

The access router 56 of the WLAN part also includes apparatus 62 of an embodiment of the present invention. In another implementation, the apparatus is located elsewhere at the WLAN, such as at an access point 52. The apparatus 62 embodied at the access router also includes a detector, here a detector 74 that operates to detect delivery of messages generated by the message generator 58 to the WLAN part indicating residency of the mobile node therewith.

The apparatus 62 embodied at the access gateway further includes an ID broadcaster 78. The ID broadcaster is coupled to receive indications, here represented by way of the line 79, of detections made by the detector 74 of residency of the mobile node with the WLAN part of the home operator network. The ID broadcaster operates to generate Proxy ARP (Address Resolution Protocol), or Gratuitous ARP messages to alert other devices of the communication system, such as the Gateway network such as the Home Agent, the Gateway to the HMON, other GGSNs, other access routers that act as gateway to WLAN and other routers within the Gateway network 22, of the residency of the mobile node with the WLAN part. Data subsequently to be communicated to the mobile node is better able to be delivered, in a timely manner, to the mobile node.

The home operator network 14 is here representative of a network in which a mobile node, such as the mobile node 12, does not need to acquire a new care-of-address (COA) irrespective of with which of the network parts that the mobile node is resident. In other words, the mobile node is addressed by its home IP address that is assigned to the mobile node by the home network of the mobile node. And, packets are thereafter routed to the mobile node using conventional, IP routing, e.g., without the use of MIP (Mobile Internet Protocol). The mobile node is assigned with a single home IP (Internet Protocol) address by the home network, here in accordance with MIPv4. And, the home agent provides home agent services when the mobile node is beyond the home mobile operating network 14. And, triggers, or, alternately, some form of signaling, are used to trigger the access router 56 or GGSN 44 to intercept datagrams on behalf of the mobile node. One such message, the Mobile IP registration message sent by the mobile to its home agent could be a trigger so that the Home Agent could send either a Gratuitous ARP or Proxy ARP on behalf of the either the GGSN or the access router so that either one of the network element would be able to intercept datagrams on behalf of a particular mobile. The other triggers can come from the UMTS/GPRS network if the mobile is resident in the UMTS/GPRS network or from the WLAN network if the mobile is in the WLAN.

The home agent here also selectably includes apparatus 79 of an embodiment of the present invention. The apparatus 79 includes a broadcaster 80 that selectably operates to generate Gratuitous-ARP or Proxy-ARP on behalf of the GGSN 44 or the access router 56, thereby to facilitate intercept of the datagrams. That is to say, the home agent selectably further operates to alert the network to indicate that, if datagrams intended for a mobile node 12 with a particular Internet Protocol address arrives at the network, the datagrams are sent to the Layer 2 address of either the GGSN or the access router. In this scenario, neither the GGSN nor the access router are involved in the messaging, i.e., sending of the Gratuitous ARP or Proxy ARP, indicating the Internet Protocol address of the mobile nodes and their Layer 2 address. So, the home agent here basically performs this on their behalf, in essence, becoming a Proxy-Proxy ARP or a Proxy-Gratuitous-ARP, in which the proxy is the home agent.

And, in a further embodiment of the present invention, the home agent further comprises a message detector 82. The detector 82 here operates to detect reception at the home agent of a mobile lPv4, or other appropriate message that indicates de-registration of the mobile node. Deregistration indicates that the mobile node is 'at home.' Analogous messages can, instead, indicate to the home agent in which part of the network, i.e., the WLAN part 16 of the GPRS part 18 that the mobile node is resident. The home agent then performs the Proxy ARP or Gratuitous ARP on behalf of either the GGSN or the access router. In this embodiment, modifications need not be made to either to the GGSN 44 of the GPRS network 18 or the Access Router 56 of the WLAN 16. The home agent here is already equipped with the capability to perform the Proxy ARP and Gratuitous ARP. And, the home agent need only be notified of the IP address of either the GGSN or the Access Router. The home agent is then able to determine the MAC address of the GGSN or the access router using an ARP table.

The network parts 16 and 18 share the single home agent 24. And, home addresses are assigned from within the home agent subnetwork. When a mobile node is in its home mobile operating network 14, then the home agent need not be active and is only involved in forwarding of datagrams like a regular router to either of the network parts The home agent is active when the mobile node is visiting outside of the home operator network and is involved in tunnel, establishment, tunneling and interception of packets intended for mobile nodes that have binding entries at the home agent.

The home agent intercepts datagrams intended for a particular mobile node after a registration request, or other appropriate, message, from the mobile node when the mobile node is outside of the home mobile operator network 14, which is beyond the scope here. The access router 56 of the WLAN part intercepts datagrams intended for the mobile node when the mobile node is in the WLAN part of the home operator network. And, the GGSN 44 intercepts datagrams intended for the mobile node when the mobile node is in the GPRS part 18 of the home mobile operator network. If a mobile node loses connectivity to the WLAN part of a foreign operator network, or a WLAN controlled by an ISP (Internet Service Provider), then the GGSN that is serving the mobile node is notified to intercept datagrams on its behalf assuming that the mobile has a connection to its home UMTS/GPRS network.

If the mobile node enters the WLAN part 16 of the home operator network, then the access router 56 sends a Gratuitous ARP or a Proxy ARP broadcast with its link-layer address, in this case the MAC address of the access router as the destination for all datagrams intended for the mobile node that is resident with the WLAN part of the network. The Gratuitous ARP or the Proxy ARP informs the Gateway router (Router that is directly connected to both the Access router and GGSN) to map the mobile's home IP address with that of the access router's MAC address. As a result, as soon as a datagram directed to the mobile node enters the gateway network 22, the datagrams are sent to the MAC address of the access router. The access router intercepts the datagrams and forwards the datagrams through the WLAN part using the IEEE 802.11 mechanism, after having changed the MAC address from its own to reflect that of the 802.11 MAC address of the mobile node. Analogously, if the mobile node is in the GPRS part of the home operator network then the GGSN 44 after being triggered either by the home agent or some message from within the UMTS/GPRS network sends either a Gratuitous ARP or a Proxy ARP with its own MAC address as the destination for all datagrams intended to the mobile node that is resident within the UMTS/GPRS part of the home operator network. When the datagrams intended for a mobile enters the gateway router within the gateway network that has connections to both the GGSN and the access router, the gateway forwards the datagrams to the GGSN. The GGSN then intercepts the datagrams and forwards the datagrams through the GPRS network, using GTP to the appropriate SGSN that, in turn, forwards on the datagrams to the mobile node.

The apparatus 62 embodied at the GGSN 44 and access routers 56 include lists, here designated at 86 and 88, respectively, at which lists are maintained of the mobile nodes resident with, or otherwise within the coverage area of the respective parts of the home operator network. The lists also contain information of the IP addresses of each mobile node, the Medium Access Control addresses at the access router, as well as other information, as appropriate. Triggers are used when the mobile node moves between access technologies in the heterogeneous network to notify, as appropriate, the GGSN or the access router, about the arrival of the mobile node within the respective coverage areas. The access routers and the GGSN periodically, or at selected intervals, send proxy ARP messages on behalf of the mobile nodes within the respective network parts to update an ARP table, indicated at 92, within the home gateway network. The Home Agent can also send Proxy ARP on behalf of either the GGSN or the access router which again act as proxies to the mobile node if the mobile node is residing in either of the network parts. Analogous mechanisms are utilized in a network that utilizes IPv6 protocols with neighbor discovery procedures to achieve mobility management within the home operator network.

Figure 2:
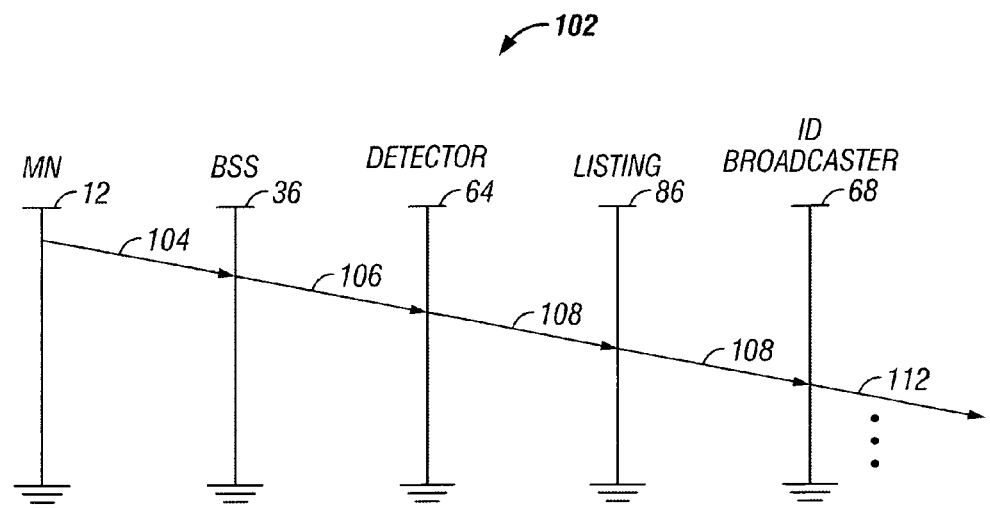
FIG. 2 illustrates a message sequence diagram showing signals generated during operation of the communication system shown in FIG. 1.

FIG. 2 illustrates a message sequence diagram, shown generally at 102, representative of signaling generated during operation of the communication system shown in FIG. 1 pursuant to an embodiment of the present invention. Here, the mobile node becomes resident with the GPRS network part 18 of the home operator network. The mobile node, at the message generator thereof, generates a registration message, indicated by the segment 104, which is delivered to the base transceiver station of the base station system 36. Indications of the detection at the base station system of the message are provided, as indicated by the segment 106, to the detector 64 of the apparatus 62. The detector, in turn, provides indications of detection of the residency of the mobile node with the GPRS to the listing 86 and to the ID broadcaster 68, as indicated by the segments 108. Thereafter, and as indicated by the segment 112, the indications of the residency of the mobile node at the GPRS network are broadcast indicated by the segment 112.

Figure 3:
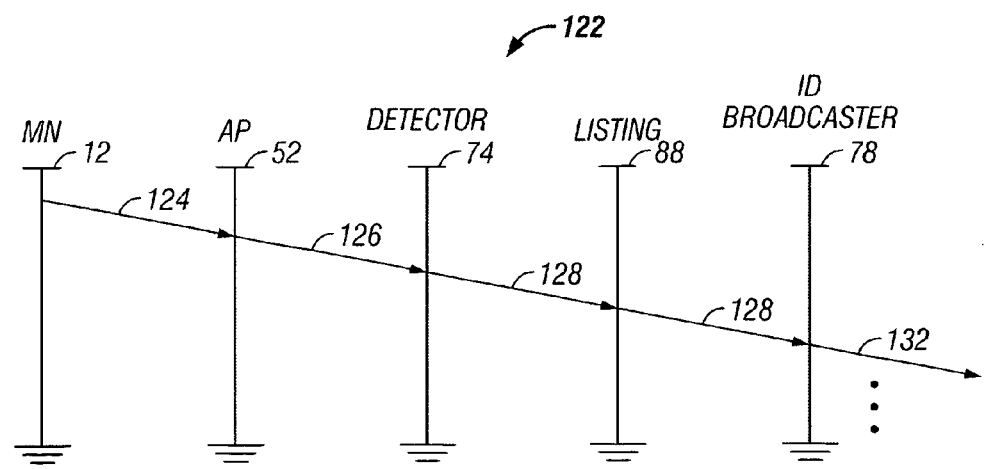
FIG. 3 illustrates a message sequence diagram, similar to that shown in FIG. 2, but of signals generated during additional operation of the communication system shown in FIG. 1.

FIG. 3 illustrates a message sequence diagram 122, also representative of operation of the communication system 10 pursuant to an embodiment of the present invention. Here, the mobile node becomes resident with the WLAN part 16 of the home operator network. A registration message is generated, indicated by the segment 124 that is detected by the access point 52. In turn, the access point notifies, indicated by the segment 126, the access router forwards on the indications of residency of the mobile node with the WLAN part of the home operator network to the detector 74. And, in turn, the detector forwards on such indications to the listing 88 and to the ID broadcaster 78. Thereafter, the ID broadcaster 78 generates one or more broadcasts, indicated by the segments 132.

Thereby, the residency of the mobile node with one, or the other, of the network parts of the home operator network is identified in the Proxy ARP or Gratuitous ARP broadcasts by the ID broadcaster 68 or 78. More timely delivery of a datagram to a mobile node is thereby facilitated.

The previous descriptions are of preferred examples for implementing the invention, and the scope of the invention should not necessarily be limited by this description. The scope of the present invention is defined by the following claims:

The invention claimed is:

1. In a radio communication system having a network including a first part operable pursuant to a first operating protocol and a second part operable pursuant to a second operating protocol, and the radio communication system having a mobile node selectably operable pursuant to each of the first and second operating protocols and positionable to be resident with either of the first part and the second part, an improvement of apparatus for facilitating routing of a datagram to an appropriate one of the first part and the second part, said apparatus comprising:

a detector operable to receive a mobile-generated message from the mobile node indicating residence of the mobile node within one of the first part and the second part of the network;

a network-based identification broadcaster at least coupled to receive presence indication representative of residence of the mobile node with either of the first part and the second part of the network from said detector, and in response thereto, said network-based identification broadcaster for generating and simultaneously broadcasting to nodes other than the mobile node within both the first part and the second part of the network a broadcast message identifying the mobile node, the residence thereof with either of the first part and the second part of the network, and an address of a network element responsible for forwarding of the datagram to the mobile node within either of the first part and the second part of the network.

2. The apparatus of claim 1 wherein said detector detects in which, if any, of the first part and the second part with which the mobile node is resident based on the mobile-generated message.

3. The apparatus of claim 2 wherein said detector comprises a first part detector portion associated with the first part of the network, said first part detector portion for detecting residence of the mobile node with the first part of the network.

4. The apparatus of claim 3 wherein said detector comprises a second part detector portion associated with the second part of the network, said second part detector portion for detecting when the mobile node is resident with the second part of the network.

5. The apparatus of claim 2 wherein the mobile node selectably generates a registration message and wherein said detector detects in which, if any, of the first part and the second part with which the mobile node is resident responsive to detection of the registration message.

6. The apparatus of claim 5 wherein the registration message generated by the mobile node is selectably of a first type and of a second type, generation of the first type made when the mobile node is to be resident with the first part and generation of the second type made when the mobile node is to be resident with the second part, and wherein said detector comprises parts capable of detecting the registration message of the first type and of the second type.

7. The apparatus of claim 1 wherein the network further comprises a home agent and wherein said detector is embodied at the home agent.

8. The apparatus of claim 7 wherein said network-based identification broadcaster is embodied at the home agent.

9. The apparatus of claim 1 wherein said network-based identification broadcaster comprises a first part identification broadcaster portion associated with the first part of the network, said first part identification broadcaster portion for broadcasting the message identifying the mobile node, the residence thereof when the mobile node is resident with the first part of the network, and the MAC address of the network element responsible for forwarding of datagrams to the mobile within the first part of the network.

10. The apparatus of claim 9 wherein the first part of the network comprises a WLAN (Wireless Local Area Network) having an access router, and wherein said first part identifier broadcaster portion is embodied at the access router of the WLAN.

11. The apparatus of claim 10 wherein said first part identifier broadcaster portion performs Proxy or Gratuitous Address Resolution Protocol (ARP) broadcasts at selected intervals responsive to residence of the mobile node with the WLAN.

12. The apparatus of claim 11 further comprising a first part listing maintained at the WLAN, the first part listing identifying indicia of the mobile node when resident with the WLAN.

13. The apparatus of claim 12 wherein the mobile node is identified by an IP (Internet Protocol) address and wherein the identifying indicia of the mobile node contained at the first part listing comprises the IP address of the mobile node along with the MAC address of the mobile node.

14. The apparatus of claim 9 wherein said network based identification broadcaster further comprises a second part identification broadcaster portion associated with the second part of the network, said second part identification broadcaster portion for broadcasting the message identifying the mobile node, the residence thereof when the mobile node is resident with the second part of the network, and the MAC address of the network element responsible for forwarding of datagrams to the mobile node within the second part of the network.

15. The apparatus of claim 14 wherein the second part of the network comprises a cellular network operable pursuant to a cellular system operating specification and having an access gateway, and wherein said second part identifier broadcaster is embodied at the access gateway.

16. The apparatus of claim 15 wherein the cellular network is operated pursuant to a GSM/GPRS (Global System for Mobile Communications/General Packet Radio Service) or UMTS operating specification, wherein the access gateway defines a GGSN (Gateway GPRS Service Node), and wherein said second part identifier is embodied at the GGSN.

17. The apparatus of claim 15 wherein said second part identifier broadcaster portion performs either Proxy or Gratuitous Address Resolution Protocol (ARP) broadcasts at selected intervals responsive to residence of the mobile node with the cellular network.

18. In a method for communicating in a radio communication system having a network including a first part operable pursuant to a first operating protocol and a second part operable pursuant to a second operating protocol, and the radio communication system having a mobile node selectably operable pursuant to each of the first and second operating protocols and positionable to be resident with either of the first part and second part, an improvement of a method for facilitating routing of a datagram to an appropriate one of the first part and the second part, said method comprising:

detecting with which of the first part and the second part of network the mobile node resides upon receipt of a mobile-generated message from the mobile node indicating residence of the mobile node within one of the first part and the second part of the network; and generating and simultaneously broadcasting to nodes other than the mobile node within both the first part and the second part of the network a broadcast message identifying the mobile node and the residence thereof with either of the first part and the second part of the network in response to the mobile-generated message and wherein the broadcast message also identifies a link-layer address of a network element that is responsible for forwarding of datagrams to the mobile node within either of the first part and the second part of the network.

19. The method of claim 18 wherein said operation of detecting comprises the operations of separately detecting, at each of the first part of the network and the second part of the network, for residence of the mobile node thereat.

20. The method of claim 18 wherein said operation of broadcasting comprises generating from the first part of the network, Proxy or Gratuitous Address Resolution Protocol (ARP) broadcasts responsive to detection of residence of the mobile node with the first part of the network.

21. The method of claim 18 wherein said operation of broadcasting comprises generating, from the second part of the network; Proxy or Gratuitous Address Resolution Protocol (ARP) broadcasts responsive to detection of residence of the mobile node with the second part of the network.

22. The method of claim 18 wherein said operation of broadcasting comprises generating from the gateway network part of the network; Proxy or Gratuitous Address Resolution Protocol broadcasts responsive to detection of residence of the mobile node within either the first or the second part of the network.

23. The method of claim 18 further comprising an operation of maintaining a listing containing identifying indicia identifying the mobile node when resident at each of the first and second parts of the network.

* * * * *